United States Patent
Domke et al.

(10) Patent No.: US 10,018,184 B2
(45) Date of Patent: Jul. 10, 2018

(54) METHOD FOR DETECTING A STATE CHANGE OF AN INSTALLATION

(71) Applicant: Robert Bosch GmbH, Stuttgart (DE)

(72) Inventors: Johannes Domke, Ludwigsburg (DE); Ralf Schmidt, Gerlingen (DE); Silas Klug, Lohmar-Birk (DE)

(73) Assignee: WEIDMÜLLER MONITORING SYSTEMS GMBH, Dresden (DE)

( * ) Notice: Subject to any disclaimer, the term of this patent is extended or adjusted under 35 U.S.C. 154(b) by 403 days.

(21) Appl. No.: 14/516,870

(22) Filed: Oct. 17, 2014

(65) Prior Publication Data

US 2015/0107343 A1    Apr. 23, 2015

(30) Foreign Application Priority Data

Oct. 22, 2013   (DE) .......................... 10 2013 221 401

(51) Int. Cl.

| | |
|---|---|
| *F03D 7/02* | (2006.01) |
| *F03D 11/00* | (2006.01) |
| *F03D 80/40* | (2016.01) |
| *F03D 17/00* | (2016.01) |

(52) U.S. Cl.
CPC .......... *F03D 11/0091* (2013.01); *F03D 17/00* (2016.05); *F03D 80/40* (2016.05); *Y02E 10/72* (2013.01)

(58) Field of Classification Search
CPC ................................. F03D 17/00; F03D 80/40
See application file for complete search history.

(56) References Cited

U.S. PATENT DOCUMENTS

| | | | | |
|---|---|---|---|---|
| 7,883,319 B2* | 2/2011 | Volkmer | ................ | F03D 17/00 416/146 R |
| 7,919,880 B2* | 4/2011 | Nielsen | ................ | F03D 7/0212 290/44 |
| 8,123,478 B2* | 2/2012 | Ahmann | ............... | F03D 7/0224 416/1 |
| 8,186,950 B2* | 5/2012 | Benito | .................... | F03D 17/00 416/39 |
| 8,222,757 B2* | 7/2012 | Schulten | ................ | F03D 17/00 290/43 |
| 8,316,716 B2* | 11/2012 | Kuhlmeier | ............. | G01H 1/003 73/587 |
| 9,133,828 B2* | 9/2015 | Egedal | .................... | F03D 7/042 |
| 9,702,342 B2* | 7/2017 | Stehlin | .................. | F03D 7/0224 |
| 9,759,068 B2* | 9/2017 | Herrig | .................. | F03D 7/0224 |

(Continued)

FOREIGN PATENT DOCUMENTS

DE                100 65 314 A1      7/2002

*Primary Examiner* — Freddie Kirkland, III
(74) *Attorney, Agent, or Firm* — Maginot, Moore & Beck LLP

(57) ABSTRACT

A method for detecting a state of change of an installation includes rotating at least one first component around a rotatable connection using a drive such that at least part of the at least one first component carries out an oscillation. The at least one first component is mechanically connected to a second component via the rotatable connection. The method further includes recording the oscillation using a third component. The method includes investigating the recorded oscillation for changes based on a reference value. The method further includes detecting the state of change of the installation in reference to the changes to based on the reference value.

13 Claims, 1 Drawing Sheet

(56) References Cited

U.S. PATENT DOCUMENTS

| | | | | |
|---|---|---|---|---|
| 2010/0133814 A1* | 6/2010 | Schulten | ............... | F03D 17/00 290/44 |
| 2013/0031966 A1* | 2/2013 | Egedal | ............... | F03D 7/042 73/112.01 |
| 2014/0241878 A1* | 8/2014 | Herrig | ............... | F03D 7/0224 416/1 |
| 2015/0345467 A1* | 12/2015 | Kramer | ............... | F03D 17/00 415/1 |
| 2015/0354402 A1* | 12/2015 | Ehsani | ............... | F03D 17/00 290/44 |
| 2015/0361956 A1* | 12/2015 | Stehlin | ............... | F03D 17/00 416/1 |
| 2016/0053748 A1* | 2/2016 | Lee | ............... | F03D 11/0091 702/182 |
| 2017/0268486 A1* | 9/2017 | Muller | ............... | F03D 7/0224 |
| 2017/0328349 A1* | 11/2017 | Pan | ............... | F03D 17/00 |

* cited by examiner

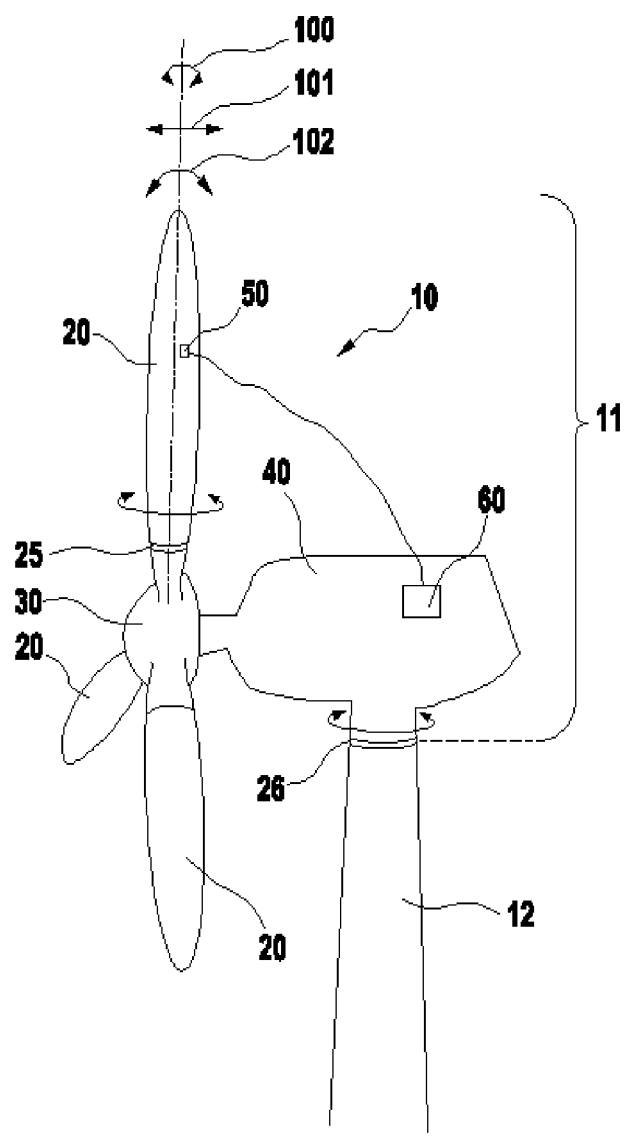

METHOD FOR DETECTING A STATE CHANGE OF AN INSTALLATION

This application claims priority under 35 U.S.C. § 119 to patent application nos. DE 10 2013 221 401.4 filed on Oct. 22, 2013 in Germany, the disclosure of which is incorporated herein by reference in its entirety.

The present disclosure relates to a method for detecting a state change of an installation, in particular a wind energy installation.

BACKGROUND

Wind energy installations are also erected at sites at risk of icing. In the USA, for example, approximately 65% of the wind energy installations are situated at sites at which icing is possible. Different meteorological phenomena may result in ice building up on the rotor blades of wind energy installations. This sometimes causes an increase in mass of up to several hundred kilograms.

Such a large increase in mass on the rotor blades may result in great stresses on and even the destruction of wind energy installations. In addition, so-called shedding of ice may result, that is to say ice is hurled away from the rotor blades. The consequence may be damage to persons, animals and materials.

A possible way of detecting ice on wind installations is sometimes legally prescribed and is used to protect the installation. After ice has been detected, corresponding countermeasures, for example de-icing or stopping of the installation, can be taken.

DE 100 65 314 B4, for example, discloses a method which can be used to detect state changes of a rotor blade, for example ice build-up, of a wind energy installation. Such detection is possible even when the rotor is at a standstill. However, this requires a special, high-resolution sensor which is fitted to the rotor blade and is connected to an evaluation unit. Such a method is very cost-intensive on account of the sensor or a plurality of sensors on a plurality of rotor blades.

It is therefore desirable to specify a possible way of detecting a state change, in particular ice build-up or damage to rotor blades of a wind energy installation, in a cost-effective manner.

SUMMARY

The disclosure proposes a method having the features of Patent claim 1. The subclaims and the following description relate to advantageous refinements.

In a method for detecting a state change, in particular ice build-up or damage to a rotor blade, of an installation, in particular a wind energy installation, having at least one first component which is connected to a further component via a rotatable connection, in which an oscillation of the first component is recorded and is investigated for changes, it is advantageous to excite the oscillation, in particular in a reproducible manner, using a drive which is present in the installation, in particular the wind energy installation, anyway.

The oscillation is preferably recorded using a sensor which is fitted to the first component and can record at least an acceleration and/or at least a rate of rotation. An oscillation can be recorded in a particularly simple and accurate way in this manner. A sensor which does not have as high a resolution as in the prior art, for example from the automotive sector, is also sufficient since the oscillation is sufficiently clear as a result of targeted excitation. This makes it possible to use cost-effective sensors.

Suitable sensors are, for example, inertial sensors, in particular acceleration sensors, for example MEMS sensors. In order to implement the disclosure in a particularly simple manner, a two-axis (x and y) acceleration sensor can be used as the inertial sensor. The applicant has already offered particularly suitable MEMS sensor arrangements for implementing the disclosure, for example under the designation MM3.10, MM5.8 or MM5.10, which can measure at least a rate of rotation and two accelerations perpendicular thereto.

The at least first component is advantageously at least one rotor blade and the further component is a hub of the wind energy installation. In this case, the rotor blade is connected to the hub by means of a rotatable connection, and the rotor blade can be rotated around the hub using a drive, in particular a pitch drive. The pitch drive and the rotatable connection are present anyway since they are needed to optimally orient the rotor blade in the wind.

It is also advantageous if the first component comprises an entire rotor with rotor blades and a nacelle and the further component is a tower of the wind energy installation. In this case, a rotatable connection to a drive, in particular an azimuth drive, is present anyway. This is needed to optimally orient the entire rotor according to the wind direction.

The method is preferably used if the hub is stationary with respect to the nacelle, for example when there is no wind. As a result ice build-up or damage to a rotor blade can already be detected before the wind energy installation is operated, and corresponding countermeasures can be taken.

Even when the installation is stationary, a method according to the disclosure makes it possible to detect natural frequencies using a cost-effective sensor system. When the installation is stationary and in the case of low wind speeds, for example less than 3 km/h, the natural frequency of the rotor blades is excited only very weakly by the wind flowing past. In the prior art, special, cost-intensive sensors are then needed to detect the oscillation. As a result of active, reproducible excitation, amplitudes of the oscillations become sufficiently large, with the result that they can also be detected using a cost-effective sensor system.

It is also advantageous if the method is integrated in an already existing installation controller and/or a condition monitoring system (CMS) of a wind energy installation. This makes it possible to reduce the necessary outlay, for example for complete additional monitoring control, and/or to simplify operation and/or monitoring of the wind energy installation.

A computing unit according to the disclosure, for example a control device of a wind energy installation, is set up, in particular by means of programming, to carry out a method according to the disclosure.

The implementation of the disclosure in the form of software is also advantageous since this enables particularly low costs, in particular if an executing computing unit is also used for further tasks and is therefore present anyway. Suitable data storage media for providing the computer program are, in particular, floppy disks, hard disks, flash memories, EEPROMs, CD-ROMs, DVDs and many more. It is also possible to download a program using computer networks (Internet, intranet, etc.).

Further advantages and refinements of the disclosure emerge from the description and the accompanying drawing.

It goes without saying that the features mentioned above and the features yet to be explained below can be used not only in the respectively stated combination but also in other combinations or alone without departing from the scope of the present disclosure.

The disclosure is schematically illustrated in the drawing using exemplary embodiments and is described in detail below with reference to the drawing.

BRIEF DESCRIPTION OF THE DRAWINGS

FIG. 1 schematically shows a wind energy installation in a preferred refinement.

DETAILED DESCRIPTION

FIG. 1 shows, by way of example, a wind energy installation 10. The wind energy installation 10 consists of an upper part 11 comprising a rotor with a hub 30 and three rotor blades 20 connected thereto as well as a nacelle 40 connected to the hub. The nacelle 40 and therefore the entire upper part 11 of the wind energy installation 20 are connected to a tower 12 via a rotatable connection in the form of an azimuth connection 26. The rotor blades 20 are also each connected to the hub 30 via a rotatable connection which is in the form of a pitch connection 25 and is shown, by way of example, for one rotor blade. The azimuth connection 26 and the pitch connection 25 can be rotated using an azimuth drive and a pitch drive, respectively.

Means which are in the form of a sensor 50 and are fitted to a rotor blade 20 are also shown by way of example. The sensor 50 is connected to a computing unit 60 which is accommodated in the nacelle 40, for example. In addition, three oscillations 100, 101, 102 are indicated using double-headed arrows which indicate an oscillation of a rotor blade 20 in different directions (100: oscillation around the longitudinal axis of the rotor blade, 101: oscillation back and forth, 102: oscillation around the hub axis).

In a first preferred refinement of a method according to the disclosure, the at least one first component of the wind energy installation 10 is in the form of a rotor blade 20. The further component is in the form of a hub 30.

In order to excite an oscillation, for example the oscillation 101 around a longitudinal axis of the rotor blade 20 as the axis of rotation, the rotor blade 20 is now rotated around the pitch connection 25 and therefore around the hub with the aid of the pitch drive. In this case, a rotation at a speed of 1°/s through an angle of 0.4° is sufficient, for example, to excite an oscillation. The specific configuration of the excitation will be chosen by a person skilled in the art as necessary, for example a speed of no more than 1°/s, 2°/s, 3°/s or 5°/s and an of no more than 0.4°, 0.5°, 1° or 1.5° etc.

In this case, the oscillation 101 is excited by such a defined type of rotation by means of the pitch drive that the oscillation 101 can be repeatedly excited in a reproducible manner.

The oscillation is recorded using the sensor 50 which may be in the form of an acceleration sensor, for example. It is also conceivable that the sensor can be used to record a plurality of accelerations in different directions and/or one or more rates of rotation. A plurality of sensors can also be used for this purpose.

The data recorded by the sensor 50 are transmitted to a computing unit 60. These data are now adapted and/or converted, for example by means of a Fourier transformation, in such a manner that characteristic values, for example a natural frequency, can be gathered therefrom for the oscillation 101 of the rotor blade 20.

In order to obtain a reference value for the natural frequency of the oscillation 101 of the rotor blade 20, the natural frequency is determined when the wind energy installation 10 is operating correctly.

In the event of state changes of the rotor blade 20, for example as a result of an increase in mass on account of ice build-up or damage, for example caused by a lightning strike, the natural frequency of the oscillation 101 is changed to lower values. This change likewise causes a change in the data recorded by the sensor 50, that is to say the changed natural frequency can be found therein.

Such a deviation in the recorded signal therefore means a state change of the rotor blade 20. Corresponding (counter) measures can be initiated. More accurate analyses of the natural frequency and its possible changes, for example, also enable more accurate interpretation, for example an increased mass caused by ice build-up, the extent of the increase in mass or a mechanical change to the rotor blade caused by a lightning strike, for example.

The method explained by way of example for the oscillation 101 can also be carried out for one of the oscillations 100, 102 and/or combinations thereof It is likewise useful to use the method, that is to say excitation and analysis of the oscillations, for each of the rotor blades 20.

In a second preferred refinement of a method according to the disclosure, the first component comprises the upper part 11 of the wind energy installation 10, that is to say the rotor blades 20, the hub 30 and the nacelle 40. The further component is in the form of a tower 12 of the wind energy installation 10.

In order to excite an oscillation, for example the oscillation 102, tangentially to an axis of rotation of the hub 30 or of the rotor, the nacelle 40 and therefore the upper part 11 are now rotated around the azimuth connection 26 and therefore the tower 12 with the aid of the azimuth drive. In this case, the rotation excites an oscillation of all rotor blades 20.

In this case, the oscillation 102 is excited by such a defined type of rotation by means of the azimuth drive that the oscillation 100 can be repeatedly excited.

The method for detecting a state change of one of the rotor blades 20, for example as a result of an increase in mass on account of ice build-up or damage, for example caused by a lightning strike, by analyzing the oscillation 102 takes place in a similar manner to the method explained above for the oscillation 101.

The method explained by way of example for the oscillation 102 can likewise also be used here for one of the oscillations 100, 101 and/or combinations thereof. It is likewise useful to use the analysis of the oscillations for each of the rotor blades 20.

What is claimed is:

1. A method for detecting a state change of an installation, the method comprising:
    rotating at least one first component around a rotatable connection at a speed of not more than 1°/s, 2°/s, 3°/s, or 5°/s through an angle of not more than 0.4°, 0.5°, 1°, or 1.5° around the rotatable connection using a drive of the installation, such that at least part of the at least one first component carries out an oscillation, wherein the at least one first component is mechanically connected to a second component via the rotatable connection;
    recording the oscillation using a third component;
    investigating the recorded oscillation for changes based on a reference value; and
    detecting the state change of the installation in reference to the changes based on the reference value.

2. The method according to claim 1, further comprising:
repeatedly reproducing the oscillation using the drive of the installation; and
recording the repeatedly reproduced oscillations using the third component.

3. The method according to claim 1, wherein:
the at least one first component includes at least one rotor blade,
the third component includes an acceleration sensor, and
the acceleration sensor is mounted to the at least one rotor blade.

4. The method according to claim 1, wherein the third component includes a sensor configured to record at least one of an acceleration and a rate of rotation.

5. The method according to claim 4, wherein the sensor is connected to a computing unit.

6. The method according to claim 1, wherein:
the at least one first component includes a rotor blade and the second component includes a hub of the installation,
the hub is rotatably mounted on a nacelle, and
the installation is a wind energy installation.

7. The method according to claim 1, wherein:
the at least one first component includes at least one nacelle of the installation,
the second component is a tower of the installation,
a hub is rotatably mounted on the at least one nacelle, and
the installation is a wind energy installation.

8. The method according to claim 6, wherein the hub is stationary in reference to the nacelle during the rotating of the at least one first component around the rotatable connection.

9. The method according to claim 1, wherein the method is integrated in at least one of an installation controller and a condition monitoring system.

10. An installation controller for detecting a state change of a corresponding wind energy installation having (i) a nacelle, (ii) a hub configured to rotate about the nacelle, (iii) at least one rotor blade mechanically connected to the hub via a rotatable connection, (iv) a drive, and (v) a sensor, the installation controller comprising:
a computing unit configured (i) to detect that the hub is stationary with respect to the nacelle, (ii) to rotate the at least one rotor blade around the rotatable connection using the drive of the wind energy installation to cause at least part of the at least one rotor blade to carry out an oscillation when the hub is stationary with respect to the nacelle, (iii) to record the oscillation using the sensor, (iv) to investigate the recorded oscillation for changes based on a reference value, and (v) to detect the state change of the corresponding wind energy installation in reference to the changes based on the reference value.

11. The computing unit according to claim 10, wherein the computing unit executes a computer program to detect the state change.

12. A method for detecting a state change of a wind energy installation including a nacelle, a hub configured to rotate about the nacelle, and at least one rotor blade extending from the hub, the method comprising:
detecting that the hub is stationary relative to the nacelle;
rotating at least one rotor blade around a rotatable connection to the hub using a pitch drive of the wind energy installation when the hub is stationary relative to the nacelle, the rotated at least one rotor blade carrying out an oscillation, wherein the at least one rotor blade defines a longitudinal axis about which the pitch drive rotates the at least one rotor blade;
recording the oscillation as a recorded oscillation value using a sensor configured to record at least one of an acceleration and a rate of rotation of the at least one rotor blade, the sensor mounted on the at least one rotor blade;
comparing the recorded oscillation value to a reference oscillation value; and
detecting the state change of the wind energy installation based on a divergence of the recorded oscillation value from the reference oscillation value when the hub is stationary relative to the nacelle.

13. The method according to claim 12, wherein during the rotating of the at least one rotor blade the rate of rotation of the at least one rotor blade is not more than 5°/s through an angle of not more than 1.5° around the rotatable connection to cause the at least one rotor blade to carry out the oscillation.

* * * * *